(12) United States Patent
Nandan

(10) Patent No.: US 9,372,817 B2
(45) Date of Patent: Jun. 21, 2016

(54) HIGH PERFOMANCE DMA CONTROLLER FOR VIDEO PROCESSORS

(71) Applicant: Texas Instruments Incorporated, Dallas, TX (US)

(72) Inventor: Niraj Nandan, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 140 days.

(21) Appl. No.: 14/330,553

(22) Filed: Jul. 14, 2014

(65) Prior Publication Data

US 2015/0016499 A1    Jan. 15, 2015

(30) Foreign Application Priority Data

Jul. 12, 2013    (IN) .............................. 3128/CHE/2013

(51) Int. Cl.
*H04N 19/433*    (2014.01)
*G06F 13/28*    (2006.01)

(52) U.S. Cl.
CPC ...................... *G06F 13/28* (2013.01)

(58) Field of Classification Search
CPC .......................... G06F 13/28; H04N 19/00515
See application file for complete search history.

(56) References Cited

U.S. PATENT DOCUMENTS 6,434,620 B1 *  8/2002  Boucher ............. H04L 12/5693
                                                       709/230
8,510,496 B1 *  8/2013  Totolos, Jr. ........... G06F 3/0613
                                                       711/147

* cited by examiner

*Primary Examiner* — Andy Rao
*Assistant Examiner* — Tyler Edwards
(74) *Attorney, Agent, or Firm* — Robert D. Marshall, Jr.; Frank D. Cimino

(57) ABSTRACT

This invention for a VDMA will enable ultra HD resolution (4K) encode/decode at 30 frames per second. This invention maximizes interconnect/DDR utilization and reduces CPU intervention using virtual alignment, sub-tile optimization, transaction breakdown strategy, 4D indexing, a dedicated interface with the host and frame padding. The VDMA has separate buffers for non-determinative synchronous data transfers and determinative asynchronous data transfers.

10 Claims, 10 Drawing Sheets

13*9 SIZE. TOP DIAGRAM NEEDS THREE REQUEST AND IN TOTAL 18 RESPONSES. BOTTOM DIAGRAM WITH VIRTUAL ALIGNMENT NEEDS 2 REQUESTS AND TOTAL 9 RESPONSES

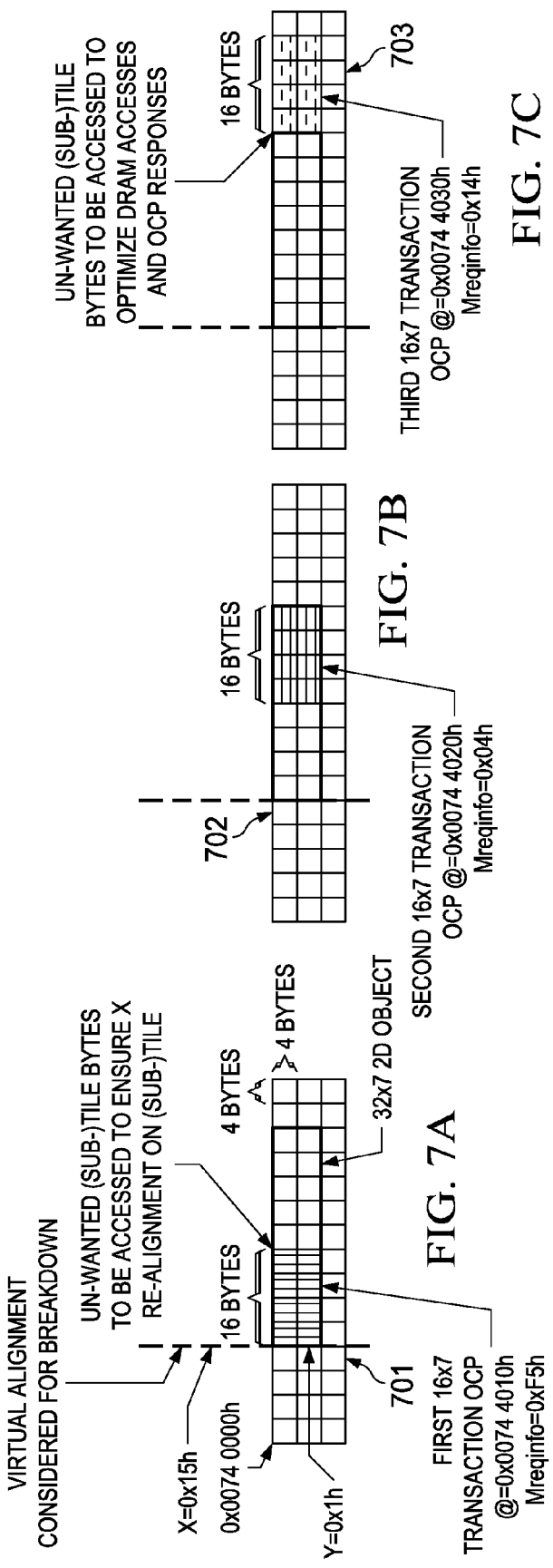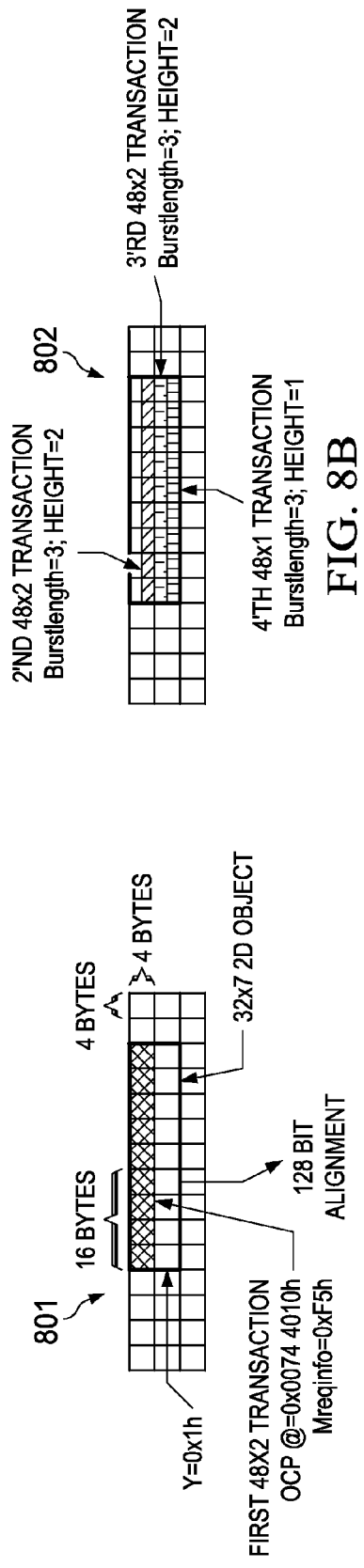

HIGH PERFOMANCE DMA CONTROLLER FOR VIDEO PROCESSORS

CLAIM OF PRIORITY

This application claims priority under 35 U.S.C. 119(a) to Indian Patent Application No. 3128/CHE/2013 filed Jul. 9, 2013.

TECHNICAL FIELD OF THE INVENTION

The technical field of this invention is direct memory access controllers for video processors.

BACKGROUND OF THE INVENTION

High Efficiency Video Coding (HEVC) is latest generation of video compression standard jointly developed by ISO/IEC and ITU-T. HEVC promises half bit-rate compared to the current de-facto standard H.264 at a similar video quality. The HEVEC standard is expected to be deployed in wide variety of video applications.

FIG. 1 illustrates an example video processing engines supporting both codecs. Video processing engine 100 includes several external interfaces: host control port 101; clock, reset and power management (PM) port 102; debug and test input 103; debug output to master 104; interface to host shared level 2 memory (SL2); two interface ports to master level 3 (L3) memory 106; and two interface ports to master level 3 (L3) memory 107. Configuration (CFG) interface 110 couples host control port 101 and debug output to master 104 to plural operational units 130. Shared level 2 memory interface (SL2IF) 140 connects operational units 130 to interface to host shared level 2 memory (SL2), dual port interface to master level 3 (L3) memory 106, and second dual port interface to master L3 memory 107.

It is important to have common DMA engine supporting multi-standard video platform to leverage its interface within the System On Chip (SOC) in both hardware and software.

SUMMARY OF THE INVENTION

This invention for a VDMA will enable ultra HD resolution (4K) encode/decode at 30 frames per second. This invention maximizes interconnect/DDR utilization and reduces CPU intervention using virtual alignment, sub-tile optimization, transaction breakdown strategy, 4D indexing, a dedicated interface with hardware accelerators (HWA) such as the plural operational units 130 illustrated in FIG. 1 and frame padding. The VDMA has separate transfer request buffers for synchronous data transfers and asynchronous data transfers. In the preferred embodiment these transfer request buffers are used by deterministic transfers or non-deterministic transfers.

BRIEF DESCRIPTION OF THE DRAWINGS

These and other aspects of this invention are illustrated in the drawings, in which:

FIGS. 7A, 7B and 7C together illustrate a tiled breakdown (height first) data transfer of a 32×7 two dimensional block;

FIGS. 8A and 8B together illustrate a raw breakdown (length first) data transfer of a 32×7 two dimensional block;

DETAILED DESCRIPTION OF PREFERRED EMBODIMENTS

There is increased emphasis on improved and innovative video solutions to facilitate video conferencing, video surveillance, transcoding, streaming video and many more customer centric new solutions. Increasing frame rate and frame size demands more bandwidth out of DDR (Double data rate SDRAM) and associated interconnect for video processing. For example, a video processing engine (IVAHD) needs close to 1.0 to 1.5 GByte/sec (decoder) and 3 GByte/sec (encoder) of system bandwidth to support 4K at 30 frames per second (fps). A single channel 32 bit DDR running at 400 MHz theoretically provides 3.2 GByte/sec bandwidth. With concurrent multimedia sub-systems of Imaging, Graphics and Display, even two such DDR channels seems insufficient to meet use cases unless there is efficient data transfer between IVAHD shared Level2 Memory (SL2) and DDR. This amount of data, the two dimensional (2D) nature of the data, two dimensional (2D) data byte alignment conflicting with interconnect word (16 Byte) alignment could not be addressed by the generic DMAs within limited interconnect bandwidth. This disclosure discusses about the video DMA engine (VDMA) running at 266 MHz which helps in overcoming these challenges and facilitates IVAHD in 4K processing per LCU (16×16) within 200 cycles. Besides efficient video object transfer done by VDMA, this disclosure also discusses ways of reducing latency in inter HWA communications and system overheads. The final design in 28 nm CMOS process is expected to consume 4 mW of encode power and occupy a silicon area of about 0.50 mm$^2$ after actual place and route. This assumes a circuit of 1280 thousand gates with 24 contexts each of size 128 Bytes.

The VDMA of this invention consisting of two major blocks: an event engine; and a service engine. The event engine serves as user and event interface for the VDMA, handling transfer descriptors, trigger management and the like. The service engine supports interfaces with DDR through SOC interconnect. For this example Open Core Protocol (OCP) interface is used for DMA external interface. This invention is equally applicable to other interface protocols.

Figure 1:
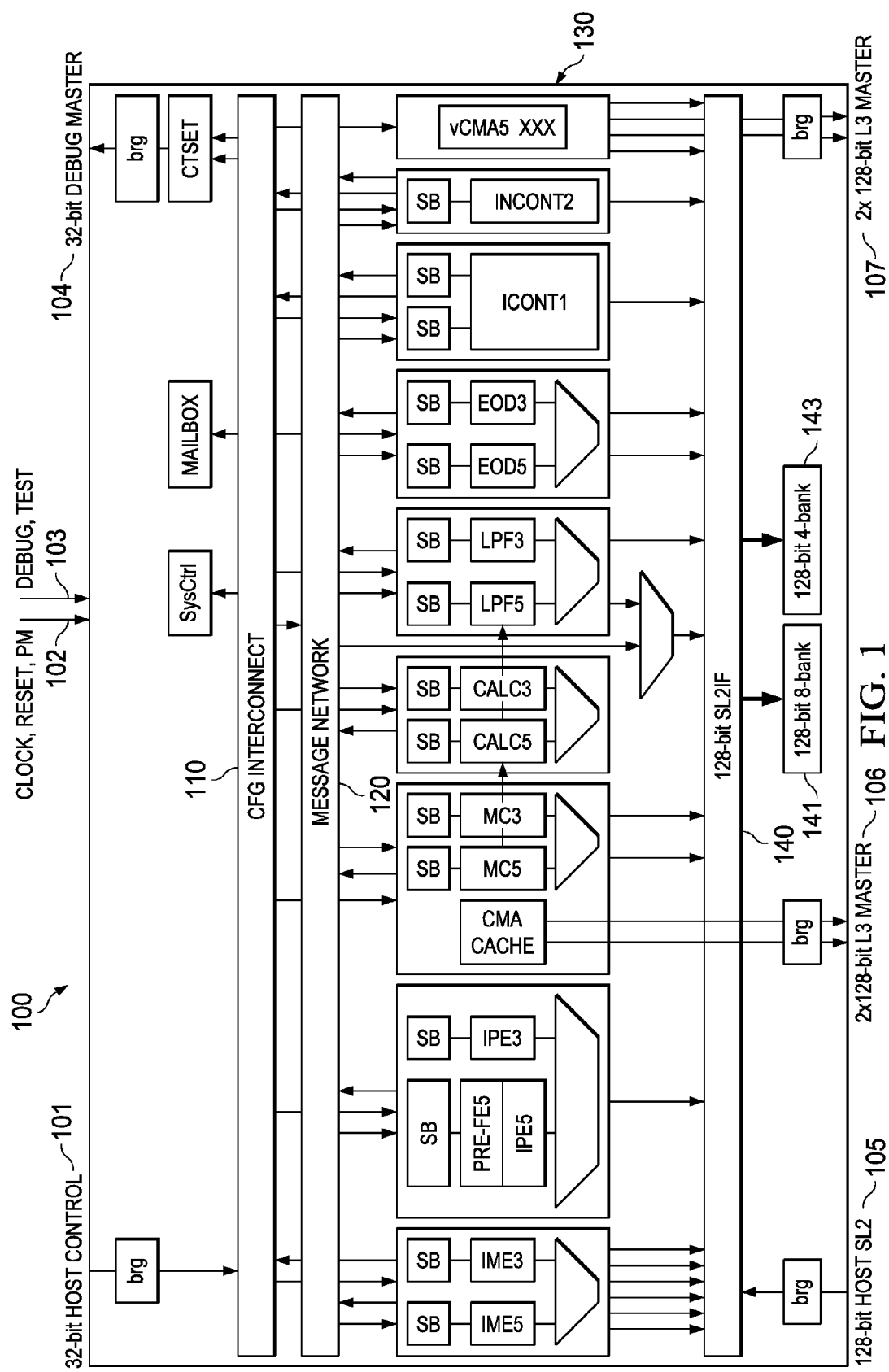
FIG. 1 illustrates an example a video processing engine to which this invention is applicable.
Figure 2:
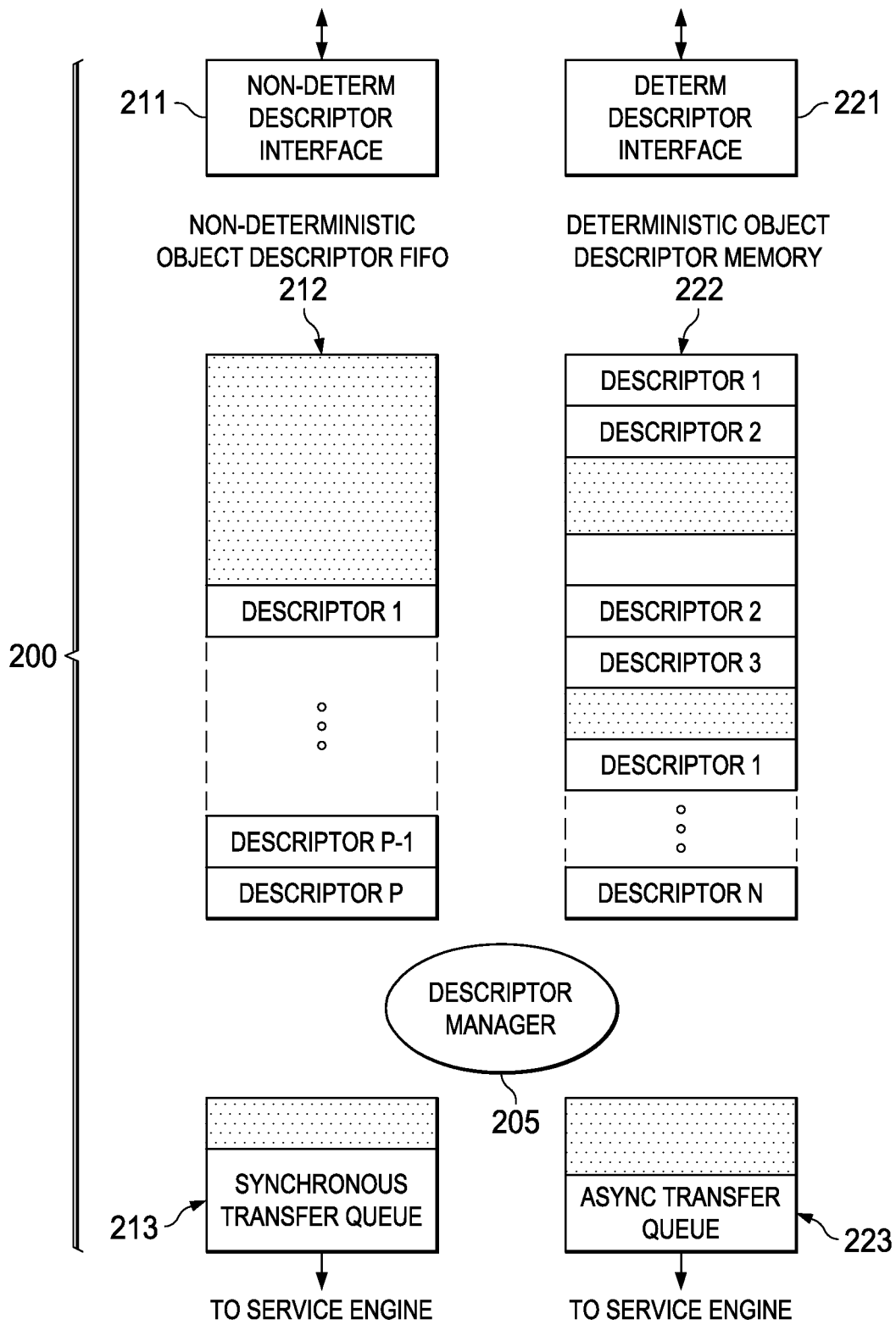
FIG. 2 illustrates an event engine of this invention.

FIG. 2 illustrates event engine 200. Non-deterministic descriptor interface 211 services access to descriptors in non-deterministic object descriptor first-in-first-out (FIFO) buffer 212. Deterministic descriptor interface 221 services access to descriptors in deterministic object descriptor memory 222. Descriptor manager 205 controls descriptor routing from non-deterministic object descriptor FIFO buffer 212 and deterministic object descriptor memory 222 to synchronous transfer queue 213 or asynchronous transfer queue 223 depending on a transfer qualifier.

Figure 3:
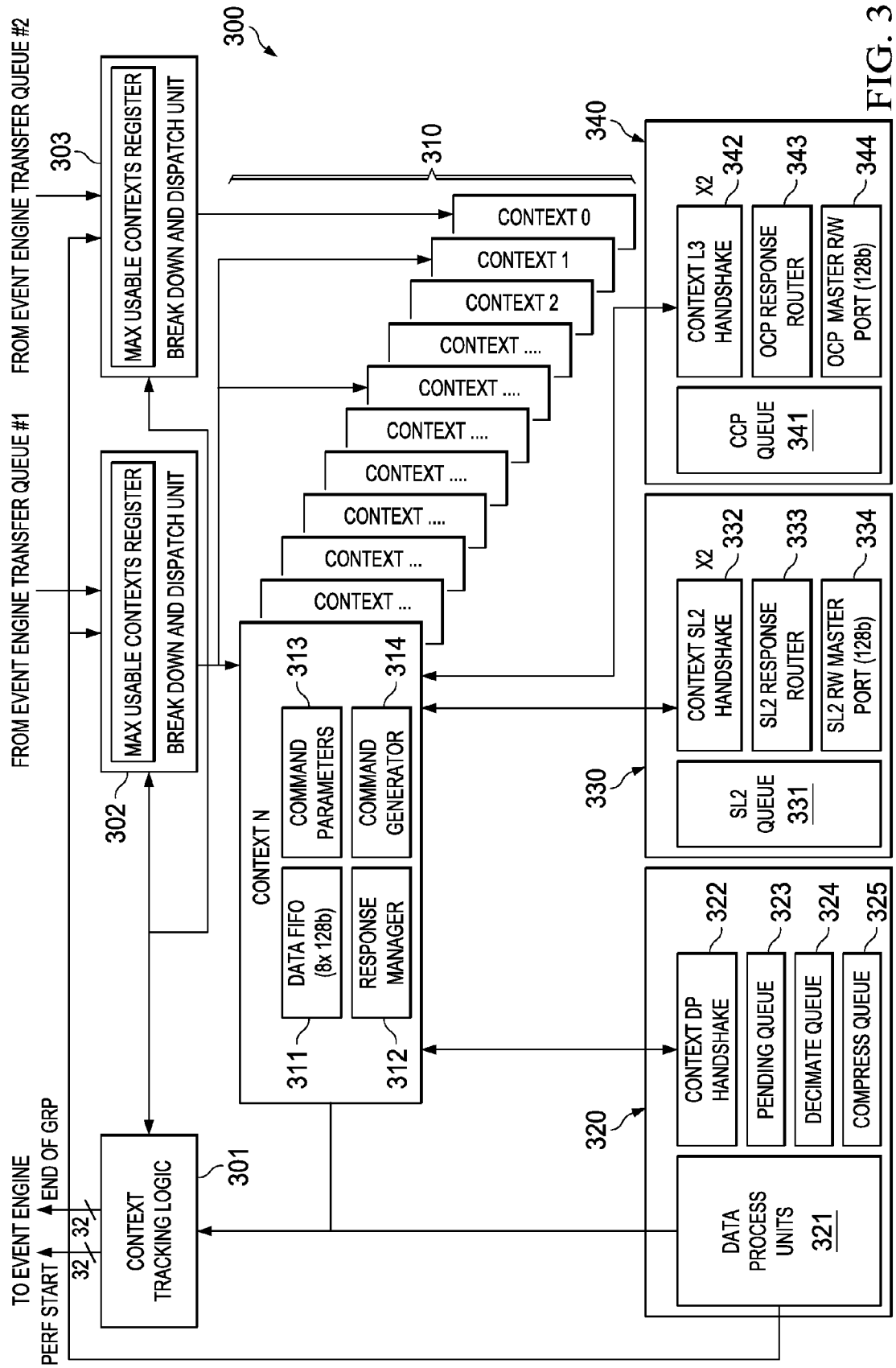
FIG. 3 illustrates a service engine of this invention.

FIG. 3 illustrates service engine 300. Context control logic 301 interfaces with event engine 200. Break down and dispatch unit 302 receives events from synchronous transfer queue 213 (event engine 200). Break down and dispatch unit 303 receives events from asynchronous transfer queue 233 (event engine 200). These units couple to plural (N) context units 310. Each context unit 310 includes data FIFO 311, resource manager 312, command parameters storage 313 and command generator 314. The plural context units 310 are bi-directionally coupled to three operational units: data unit 320; SL2 interface unit 330; and L3 interface unit 340. Data unit 320 includes one or more data processing units 321, context data (DP) handshake unit 322, padding queue 323, decimate queue 323 and compress queue 324. SL2 interface unit 330 includes SL2 queue 331, context SL2 handshake unit 332, SL2 response router 333 and SL2 read/write (R/W) master port 334. L3 interface unit 340 includes OCP queue 341, context L3 handshake unit 342, L3 response router 343 and L3 read/write (R/W) master port 344.

IVAHD video encoder and decoder works on 16×16 pixel block data and sub-sets blocks called partitions. The smallest (luma) partition is 4×4 bytes. Moving 4×4 data in pure Raster format will need 4 page openings in DDR. Due to a large page open/close penalty, moving 4×4 data from/to a single page is valuable for data transfer efficiency.

Figures 4A, 4B:
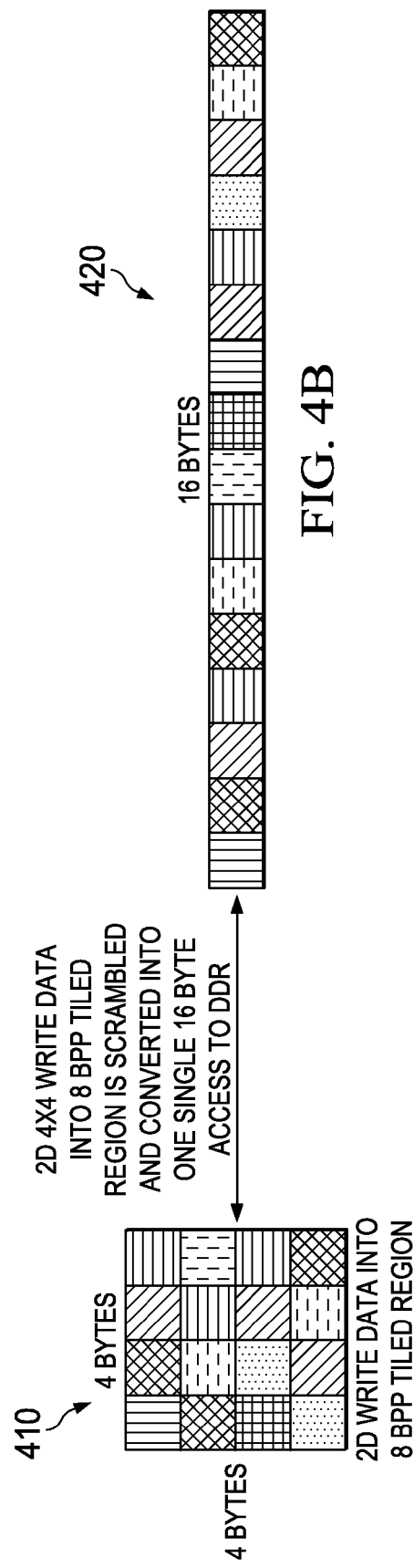
FIGS. 4A and 4B together illustrate a data storage example of 4×4 8 bit pixel data.

FIGS. 4A and 4B together illustrate this for an example of 4×4 8 bit pixel data. Block 410 (FIG. 4A) illustrates this block data arranged in a normal, raster scan order as a 4×4 pixel block. This data order is advantageous for operations dependent on pixel neighbors. Block 420 (FIG. 4B) illustrates this same block data arranged in a 16 8 bit pixels. This data order is advantageous for data reads and writes in DDR memory. This is advantageous because only a single page need be opened to transfer block 420, while block 410 may require plural page accesses.

Figure 5A:
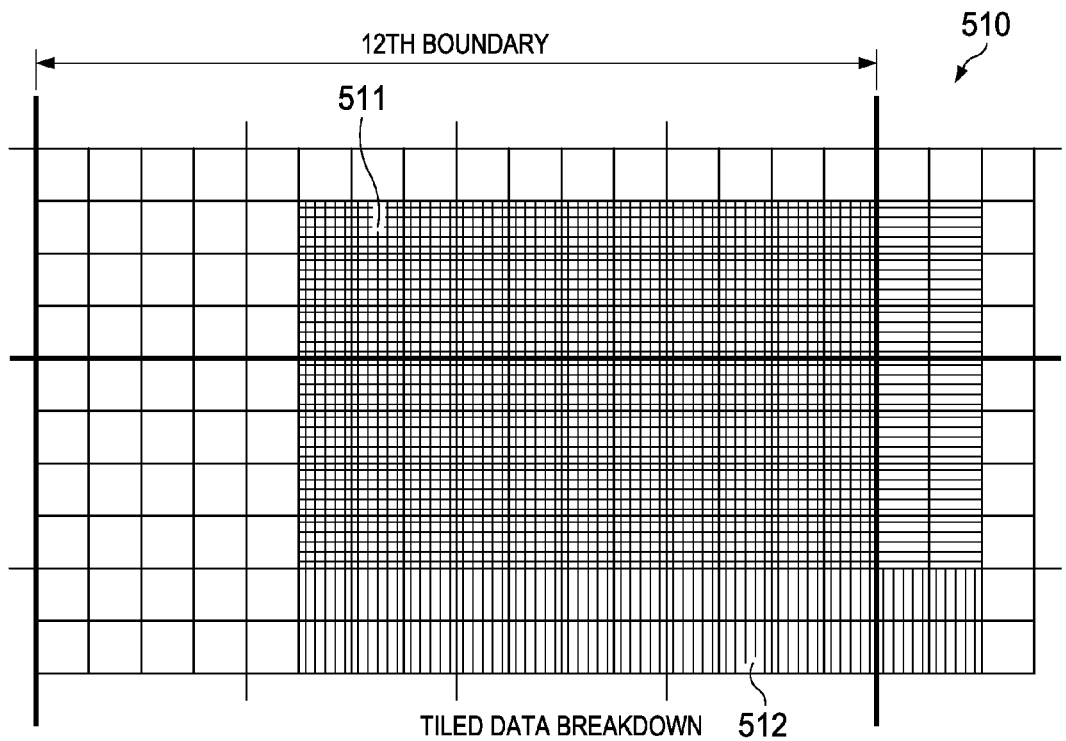
FIGS. 5A and 5B together illustrate a data transfer example for a 13×9 block not aligned with storage word (128 bit in this example) boundaries.
Figure 5B:
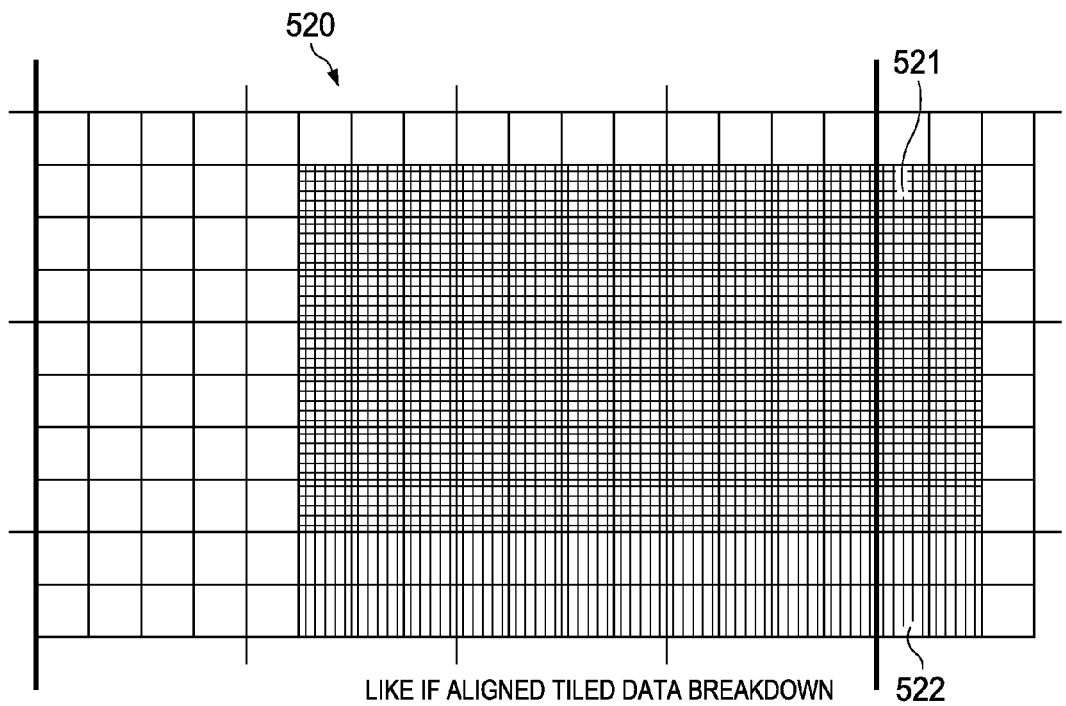

FIGS. 5A and 5B together illustrate an example data transfer. Block 510 (FIG. 5A) is a 13×9 block that is not aligned with 128 bit (16 byte) storage word boundaries. In accordance with the prior art block 510 is transferred in three requests encompassing block 511, block 512 and block 513. This results in the need for 18 memory responses (at the end of each line of each block). In the invention similar 13×9 block 520 (FIG. 5B) is transmitted with virtual storage word boundaries. Thus the block can be transmitted in two requests, block 521 and block 522. The ability to operate past the 128 bit/16 byte boundary requires only 9 responses.

In this invention a 2D tiled data transfer command and a tiler support optimizes the request pipeline. The VDMA generates a packed request as if it is aligned on 16 byte boundary. This optimizes the response pipeline in light of the unaligned (on 128 bit boundary) nature of video access.

Figure 6:
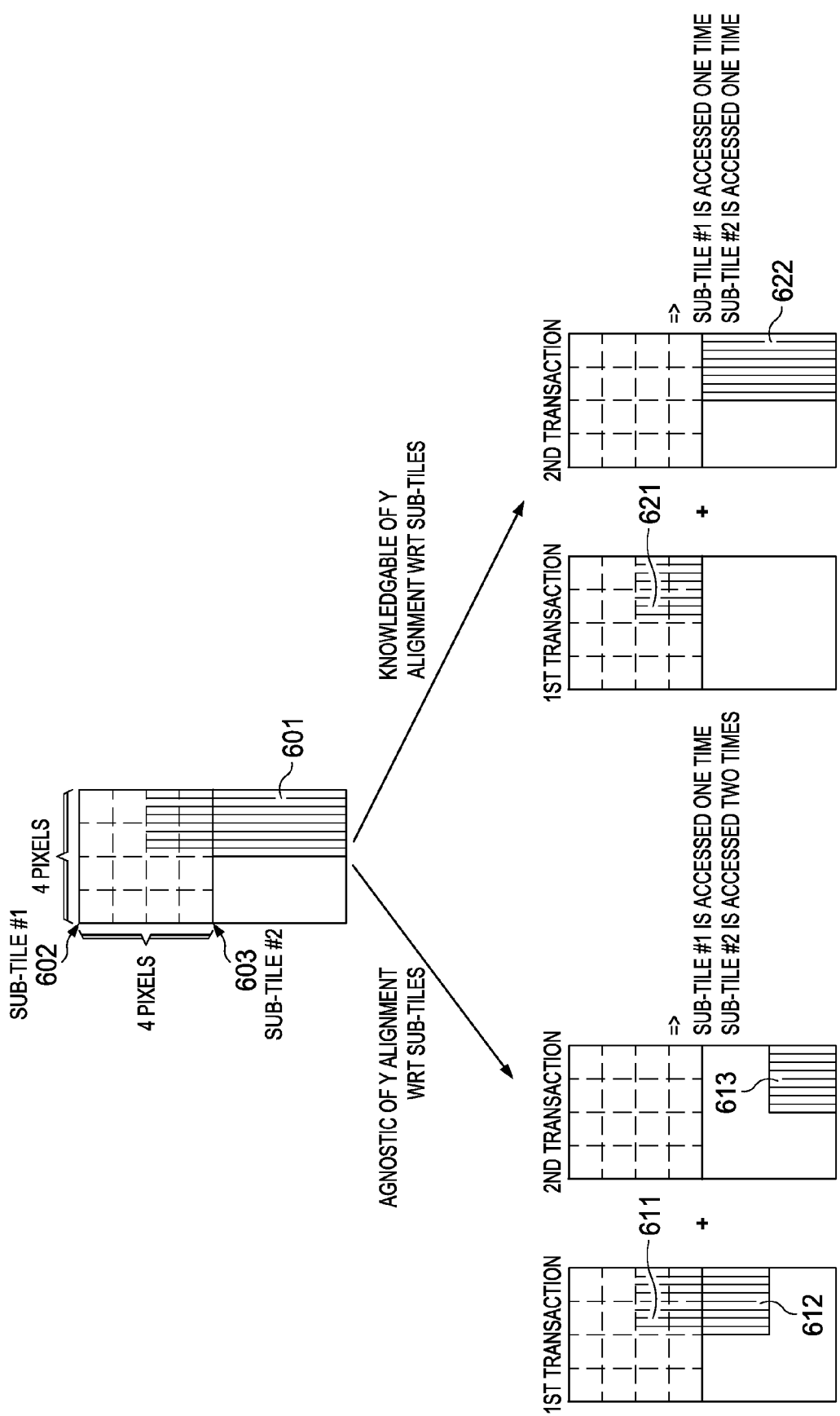
FIG. 6 illustrates a data transfer example for vertical misalignment from sub-tile boundaries.

A sub-tile is defined as DDR location containing 4×4 2D user data. Depending on original requested data's horizontal and vertical misalignment from sub-tile boundary, the number of DDR access may vary if no special care is taken care. An example explained below in conjunction with FIG. 6. Block 601 is a block of pixels to be moved. Block 601 straddles two 4×4 pixel sub-tiles 602 and 603. If the transfer system is agnostic about the y coordinate alignment, then the transfer may take place in three accesses. These are a first access to sub-tile 601 including pixels 611, an access to sub-tile 602 including pixels 612 and a second access to sub-tile 602 including pixels 613. In contrast if the transfer system is knowledgeable of the y coordinate alignment, then the transfer may take place in two accesses. These are an access to sub-tile 602 including pixels 621 and an access to sub-tile 603 including pixels 622.

This invention improves DDR access efficiency and interconnects bandwidth by virtual alignment of data transfers. FIGS. 7A, 7B and 7C together illustrate a tiled breakdown (height first) data transfer of a 32×7 two dimensional block. This needs 3 OCP requests and 18 Sub-tile (DDR) access with up to 2 page openings. The three requests are first request 701 (FIG. 7A) of a 16×7 block, second request 702 (FIG. 7B) of a 16×7 block and third request 703 (FIG. 7C) including unwanted bytes accessed to optimize DRAM accesses and OCP responses.

FIGS. 8A and 8B together illustrate a raw breakdown (length first) data transfer of a 32×7 two dimensional block. This needs 4 OCP requests and overall 18 DDR access with 7 page openings and closings. The first access 801 (FIG. 8A) is a 48×2 transfer with a burst length of 3 and a height of 2. The second access 802 (FIG. 8B) is a 48×2 transfer with a burst length of 3 and a height of 2. The third access 803 is a 48×2 transfer with a burst length of 3 and a height of 2. The fourth access 804 is a 48×1 transfer with a burst length of 3 and a height of 1.

Figure 9:
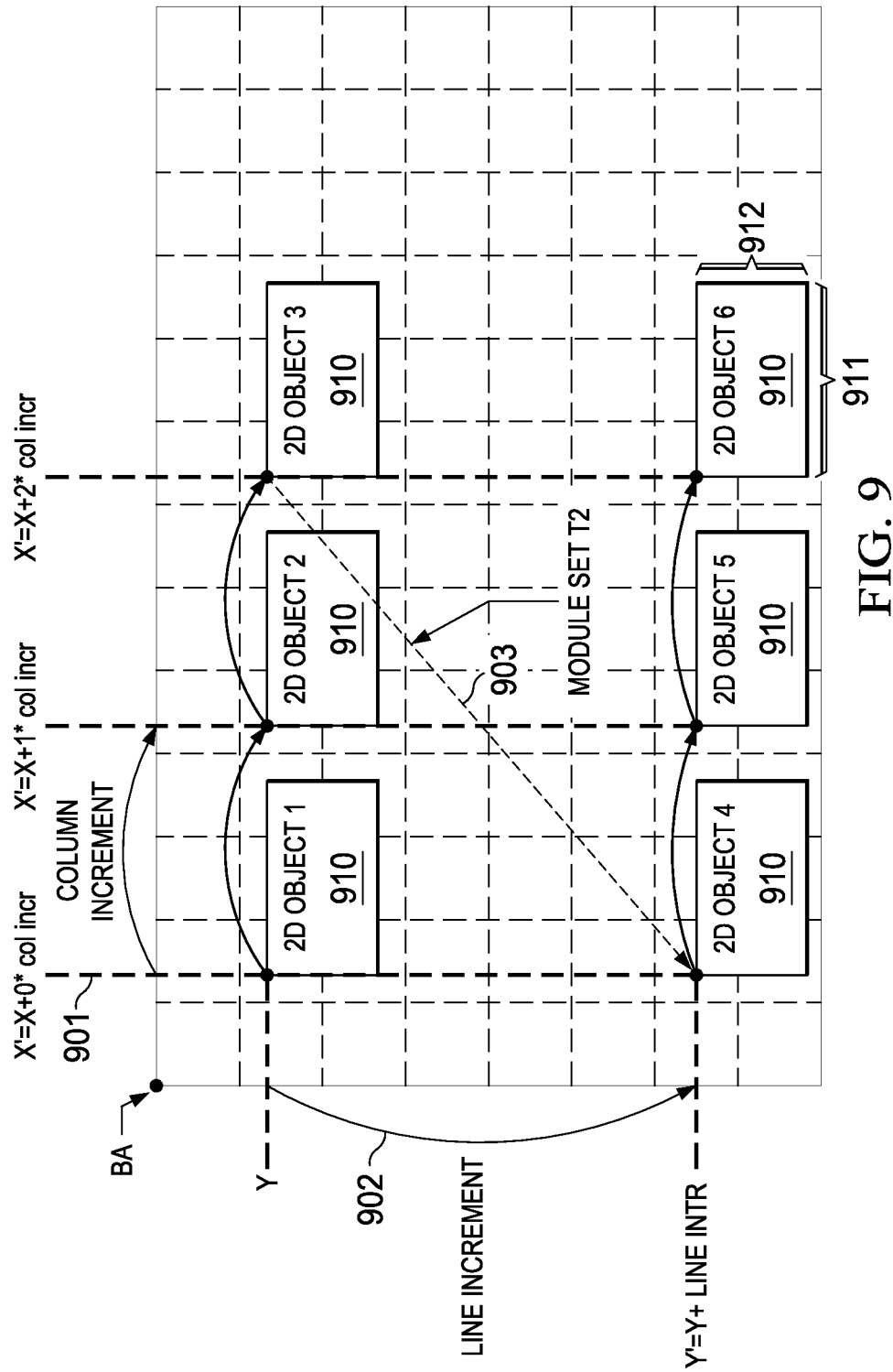
FIG. 9 illustrates a data transfer example for transfers of groups of 2D objects with 4D indexing.

Video processing requires transfers of groups of 1D and 2D objects with 4D indexing (two dimensional increment support for 2D object). This is shown in FIG. 9. A plurality of two dimensional objects 910 needs to be moved. Each two dimensional object includes a width 911 and a height 912. Each two dimensional object 910 is transferred separately as a 2D object. FIG. 9 further illustrates a column width 901 between objects 910. FIG. 9 illustrates a line increment 902 between objects 910 in a column. In the 4D transfer objects 910 are transferred in a raster scan order left to right, then top to bottom as shown in FIG. 9.

The VDMA of this invention handles synchronous transfer where the list of transfers need to finish within single macroblock (MB) pipeline and asynchronous transfers where the list of transfers independent of MB pipeline. The invention provides two internal queues having independent transaction Breakdown logic with software control of contexts. This separate hardware is illustrated in FIGS. 2 and 3.

Figure 10:
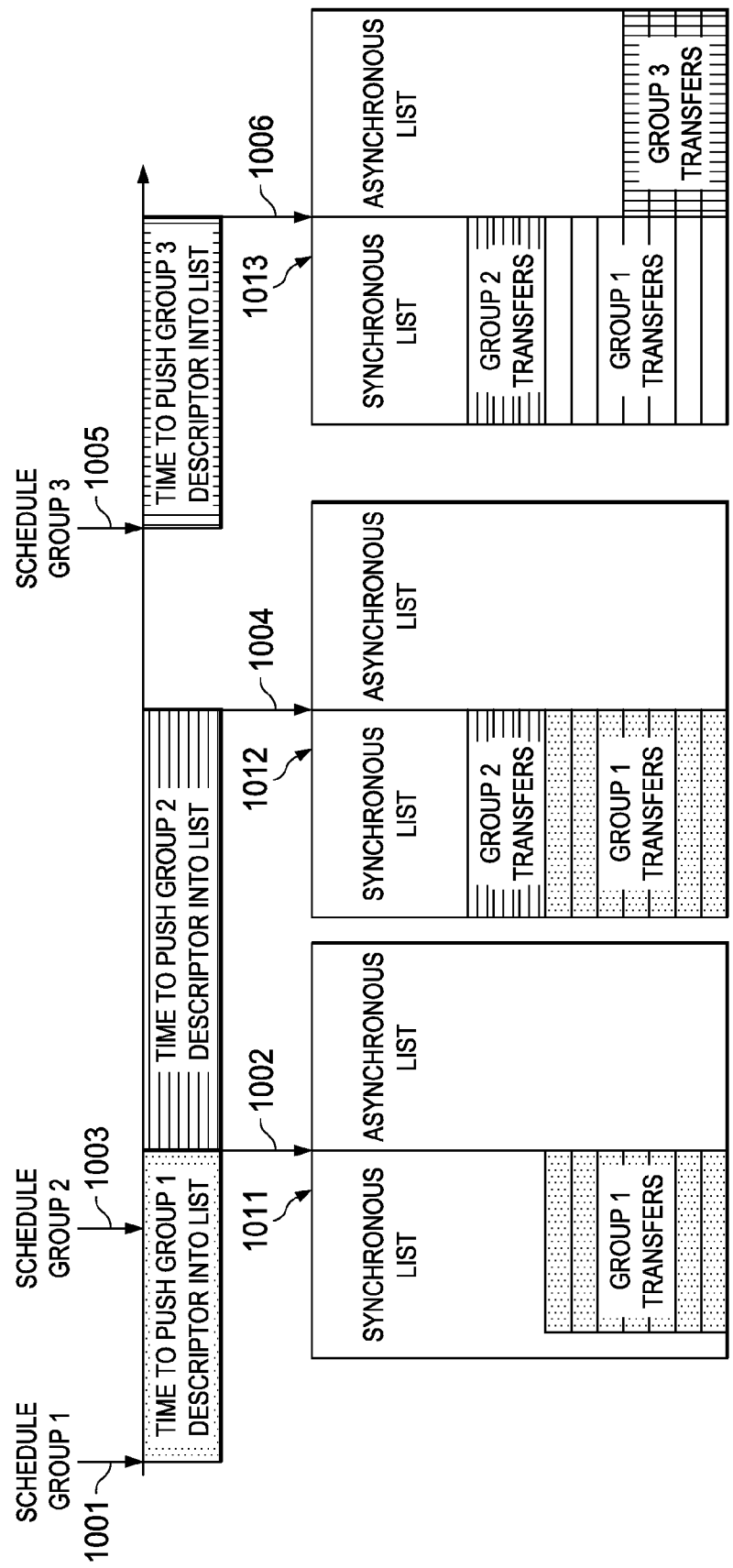
FIG. 10 illustrates how transfers are routed into independent synchronous and asynchronous queues.

FIG. 10 illustrates how transfers are controlled. A Group1 synchronous transfer is scheduled at time 1001. The corresponding set of transfer parameters are shifted into the synchronous list (corresponding to 212 of FIG. 2) at time 1002. This state is illustrated at 1011. A group2 synchronous transfer is scheduled at time at 1003. The transfer parameters are shifted into the synchronous list at time 1004. This state is illustrated at 1012. A group3 asynchronous transfer is scheduled (corresponding to 222 of FIG. 2) at time 1005. The transfers are shifted into the asynchronous list at time 1006. This state is illustrated at 1013. These lists are emptied by service engine 300 as bandwidth is available to the data transfer.

Figure 11:
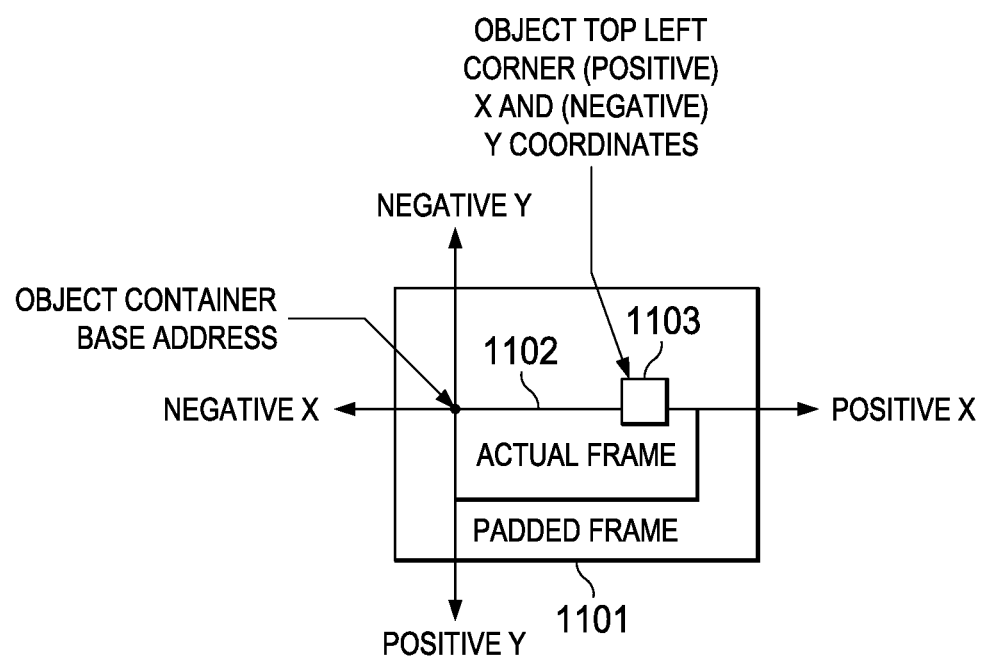
FIG. 11 illustrates an example of frame padding.

FIG. 11 illustrates a padding operation. The memory 1101 allocated to a frame is larger than the actual frame size 1102. This extra size permits the VDMA to select locations within the DDR based upon storage word boundaries regardless of the actual dimensions of the frame. FIG. 11 illustrates an object 1103 to be transferred. With the padding provided the VDMA does not need to pay as much attention to edge cases within the frame. This invention does this padding operation on reference frame on the fly.

Deterministic transfers are pre-programmed into VDMA and need a trigger to initiate transfer. The VDMA of this invention supports a dedicated trigger interface between the hardware accelerator (HWA) and VDMA to eliminate any latency between event detection and transfer schedule such as the current MB fetch for encode, deblocked frame output. This also reduces system CPU overhead in detecting trigger events such as a loop filter end of row trigger.

Non-deterministic transfers have on the fly data requirements such as a motion estimation reference frame fetch. In these transfers the descriptor along with trigger interface is supported between HWA and VDMA.

This invention transfers N MB (with N equal to 1, 2, 4, 8 or 16) of filtered data instead of a single MB at a time to improve DDR efficiency. This uses an opened page and reduces DDR access latency by transferring N MB data instead of single MB data N times. FIG. 12 illustrates an example of transferring first 4 MB of fully filtered data using single transfer event (60×12).

The more loaded the platform SOC is, the more significant the performance difference. Thus for TILER aware transactions, virtual alignment and tiled data organization not only improves performance but also show more performance robustness than classical raster addressing.

The design can reach 266 MHz in 28 nm CMOS process node. This should support overall 4K resolution at 30 fps. The overall design is estimated require a silicon area of around 0.50 mm$^2$ after final place and assuming of 65% utilization.

This invention for a VDMA will enable ultra HD resolution (4K) encode/decode at 30 frames per second. This invention maximizes interconnect/DDR utilization and reduces CPU intervention using virtual alignment, sub-tile optimization, transaction breakdown strategy, 4D indexing, a dedicated interface with the host and frame padding.

What is claimed is:

1. A direct memory access unit comprising:
a descriptor interface operable to receive data processor transfer parameters corresponding to desired data transfers;
a descriptor first-in-first-out memory having an input connected to said descriptor interface for receiving and storing said data processor transfer parameters and having an output;
a plurality of context units operable to receive said data processor transfer parameters and control data transfer operations in accordance with said data processor transfer parameters;
a breakdown and dispatch unit connected to said output of said descriptor first-in-first-out memory and to each of said plurality of context units, said breakdown and dispatch unit operable to receive said data processor transfer parameters from said descriptor first-in-first-out memory, to dispatch said data processor transfer parameters to one of said plurality of context units for control of data transfer operations; and
at least one memory interface connected to each of said plurality of context units and to at least one memory for transfer of data in accordance with said data processor transfer parameters under control of one of said context units; and
wherein each of said context units is operable to provide virtual alignment of data to be transferred with storage word boundaries of the at least one memory.

2. The direct memory access unit of claim 1, wherein:
said breakdown and dispatch unit receives transfer descriptors from said descriptor first-in-first-out memory and generates corresponding smaller transfer requests as per system constraints.

3. The direct memory access unit of claim 1, wherein:
said breakdown and dispatch unit receives transfer descriptors from said descriptor first-in-first-out memory and breaks down larger transfer requests into smaller transfer requests corresponding to source and destination types, tiled/raster storage of data and first and second dimensional nature of requested data and provides virtual alignment by passing on sideband attributes to context units.

4. The direct memory access unit of claim 1, wherein:
data subject to transfer stored in the memory consists of a plurality of bits for each pixel of a frame of picture data; and
each of said context units includes a storage buffer storing data in transit in a packed fashion.

5. The direct memory access unit of claim 1, wherein:
data subject to transfer stored in the memory consists of a plurality objects each consisting of plural pixels disposed in rectangular arrays;
each of said context units transfers said plurality of objects by transferring pixels of said rectangular array in height and width for each object in a predetermined order including column increment between objects in a horizontal dimension and line increment between objects in a vertical dimension.

6. The direct memory access unit of claim 1, wherein:
data subject to transfer stored in the memory consists of a plurality of bits for each pixel of a frame of picture data; and
each context unit allocates an area in the memory larger than the dimensions need to store a frame of picture data, whereby data transfers may exceed the area of memory allocated to said frame of picture data.

7. A direct memory access unit comprising:
a non-determinative descriptor interface operable to receive data processor transfer parameters corresponding to desired data transfers;
a non-determinative descriptor first-in-first-out memory having an input connected to said non-determinate descriptor interface for receiving and storing said data processor transfer parameters for synchronous data transfers and having an output;
a determinative descriptor interface operable to receive data processor transfer parameters corresponding to desired data transfers;
a determinative descriptor memory having an input connected to said determinate descriptor interface for receiving and storing said data processor transfer parameters for asynchronous data transfers and having an output;
a synchronous transfer queue storing synchronous transfer descriptor;
an asynchronous transfer queue storing synchronous transfer descriptor;
a descriptor manager connected to said non-determinative descriptor first-in-first-out memory, said determinative descriptor memory, said synchronous transfer queue and said asynchronous transfer queue, said descriptor manager transferring synchronous transfer descriptors from said non-determinative descriptor first-in-first-out memory and said determinative descriptor memory to said synchronous transfer queue and transferring asynchronous transfer descriptors from said non-determinative descriptor first-in-first-out memory and said determinative descriptor memory to said asynchronous transfer queue;
a plurality of context units operable to receive said data processor transfer parameters and control data transfer operations in accordance with said data processor transfer parameters;
a synchronous breakdown and dispatch unit connected to said output of said synchronous transfer queue and to each of said plurality of context units, said synchronous breakdown and dispatch unit operable to receive said data processor transfer parameters from said synchronous transfer queue, to dispatch said data processor transfer parameters to one of said plurality of context units for control of data transfer operations; and an asynchronous breakdown and dispatch unit connected to said output of said asynchronous transfer queue and to each of said plurality of context units, said asynchronous breakdown and dispatch unit operable to receive said data processor transfer parameters from said asynchronous transfer queue, to dispatch said data processor transfer parameters to one of said plurality of context units for control of data transfer operations; and at least one memory interface connected to each of said plurality of context units and to at least one memory for transfer of data in accordance with said data processor transfer parameters under control of one of said context units; and wherein each of said context units is operable to provide virtual alignment of data to be transferred with storage word boundaries of the at least one memory.

8. The direct memory access unit of claim 7, wherein:

data subject to transfer stored in the memory consists of a plurality of bits for each pixel of a frame of picture data; and each of said context units provides virtual alignment of data to be transferred with storage word boundaries of the at least one memory by organizing data to be transferred in sub-tiles of pixels.

9. The direct memory access unit of claim 7, wherein:

data subject to transfer stored in the memory consists of a plurality objects each consisting of plural pixels disposed in rectangular arrays;

each of said context units transfers said plurality of objects by transferring pixels of said rectangular array in height and width for each object in a predetermined order including column increment between objects in a horizontal dimension and line increment between objects in a vertical dimension.

10. The direct memory access unit of claim 7, wherein:

data subject to transfer stored in the memory consists of a plurality of bits for each pixel of a frame of picture data; and each context unit allocates an area in the memory larger than the dimensions need to store a frame of picture data, whereby data transfers may exceed the area of memory allocated to said frame of picture data.

* * * * *